W. M. HILL.
TIRE.
APPLICATION FILED MAR. 25, 1915.
1,159,026.
Patented Nov. 2, 1915.
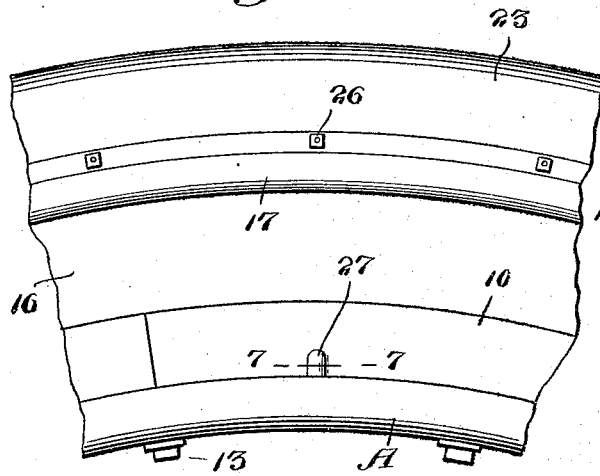
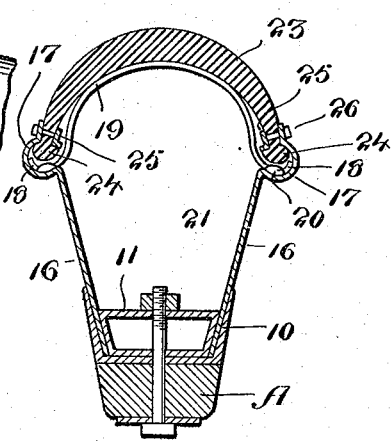
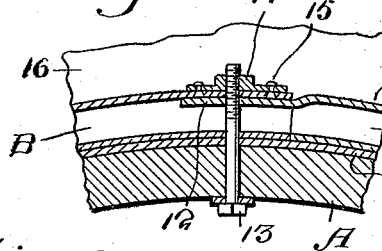
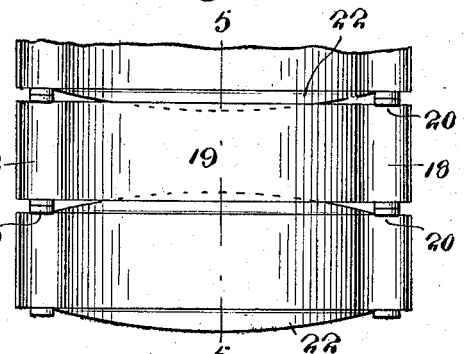
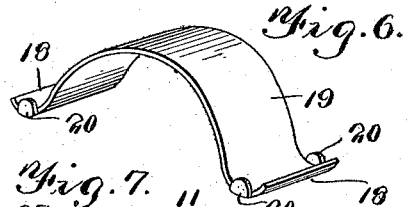
Witnesses
Inventor
William M. Hill
Victor J. Evans
Attorney

UNITED STATES PATENT OFFICE.

WILLIAM M. HILL, OF MINATARE, NEBRASKA.

TIRE.

1,159,026.  Specification of Letters Patent.  Patented Nov. 2, 1915.

Application filed March 25, 1915. Serial No. 16,982.

*To all whom it may concern:*

Be it known that I, WILLIAM M. HILL, a citizen of the United States, residing at Minatare, in the county of Scotts Bluff and State of Nebraska, have invented new and useful Improvements in Tires, of which the following is a specification.

The invention relates to a tire construction, and more particularly to the class of non-inflatable tires for automobile wheels.

The primary object of the invention is the provision of a tire of this character wherein the use of air is entirely eliminated for the inflating of the tire, yet the same will possess the required resiliency and flexibility to absorb shocks and jars incident to the travel thereof without liability of punctures or blow-outs.

Another object of the invention is the provision of a tire of this character wherein the life of the same is materially increased, and which is of novel form to avoid the use of a large amount of rubber, thereby minimizing the cost of the same.

A further object of the invention is the provision of a tire of this character wherein the same is prevented from creeping on the felly of the wheel, and also which can be readily assembled, mounted on or removed from the said felly.

A still further object of the invention is the provision of a tire of this character which is simple in construction, reliable and efficient in its purpose, strong, durable and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a fragmentary side elevation of a tire constructed in accordance with the invention. Fig. 2 is a vertical transverse sectional view thereof. Fig. 3 is a fragmentary vertical longitudinal sectional view through the tire. Fig. 4 is a plan view of the spring tread plate. Fig. 5 is a sectional view on the line 5—5 of Fig. 4. Fig. 6 is a perspective view of one of the spring tread plates. Fig. 7 is a sectional view on the line 7—7 of Fig. 1. Fig. 8 is a side elevation of the tire in its completed form and applied to the felly or rim of the wheel.

Similar reference characters indicate corresponding parts throughout the several views in the drawing.

Referring to the drawings in detail, A designates the felly of an automobile wheel having cylindrical inner and outer peripheries, and upon the outer periphery is mounted a channeled annulus 10 preferably made in section, and in the channel of which is fitted a wedge clamping ring 11 formed of a plurality of sections B, each having one end provided with an extension 12 which is adapted to fit within the end of a section adjacent thereto, and passed through the extensions 12 and the ends of the sections receiving the same are securing bolts 13 which are also passed through the felly A and have threaded thereon nuts 14 through which are passed rivets 15 securing the latter to the clamping ring 11, and in this manner the same is firmly secured in the channel which is correspondingly shaped thereto of the annulus 10 for a purpose presently described.

Arranged at opposite sides of the ring 11 and secured in the annulus 10 thereby are ring-like resilient side cheeks 16 formed with semi-tubiform flanges 17 providing seats for the outer curled ends 18 of a series of circumferentially arranged outwardly bowed resilient tread plates 19 which are formed at their curled ends 18 with upwardly turned abutment ears 20 which contact with each other at the adjacent ends of the respective plates of the series to hold the same in proper relation and against riding over each other. The cheeks 16, together with the plates 19 form an air space 21 centrally of the tire. Alternate plates 19 of the series are formed with offset flared portions 22 to underlap the remaining plates 19 of the series, as is clearly shown in Figs. 4 and 5 of the drawing. The flared portions 22 are materially thinner than the remaining portions thereof so as to provide a substantially even joint.

Superimposed upon the tread plates 19 is a resilient tread strip or section 23 preferably made from rubber having the enlarged or beaded edges 24 which are received in the flanges 17, and disposed against the inner surface of this section 23 and abutting the beaded edges 24 are angle rings 25 through which are passed at intervals bolt members 26, the same being also passed through the flanges 17 for securely fastening the tread section 23 in position, the rings 25 being designed to serve as reinforcements and additionally for securing the said tread section in the seats formed by the flanges.

At predetermined points throughout the circumference of the tire on each side thereof are outwardly struck bulges 27 formed in the walls of the respective annulus 10 and the side cheeks 16 so that the latter are prevented from creeping in the channeled annulus when secured therein by the wedge ring 11 fitted within its channel.

By reason of the particular construction of the tire the same will possess maximum resiliency and flexibility to absorb all shocks and jars incident to the travel thereof, yet the same will be devoid of punctures or blow-outs, thereby increasing the life of the tire for rendering it thoroughly serviceable.

From the foregoing description, taken in connection with the accompanying drawing, the construction and advantages of the device will be clearly understood, and therefore a more extended explanation has been omitted.

What is claimed is:—

The combination with a wheel felly, of a tire comprising resilient annular side cheeks mounted upon the felly and having outer peripheral flanges, a plurality of outwardly bowed resilient plates having outwardly curled ends engaged in the said flanges, a resilient tread section superimposed upon the plates and having its side edges secured to the flanges, ears formed on the outwardly curved ends of the plates at opposite side edges thereof and abutting each other, and offset flared portions formed on alternate plates and underlying the edges adjacent thereto of the remaining plates.

In testimony whereof I affix my signature in presence of two witnesses.

WILLIAM M. HILL.

Witnesses:
BENNETT S. JONES,
G. W. PARKER.

Copies of this patent may be obtained for five cents each, by addressing the "Commissioner of Patents, Washington, D. C."